(12) United States Patent
Xu et al.

(10) Patent No.: US 10,328,461 B2
(45) Date of Patent: Jun. 25, 2019

(54) VIBRATION MOTOR

(71) Applicant: AAC Technologies Pte. Ltd., Singapore (SG)

(72) Inventors: Hongfu Xu, Shenzhen (CN); Fanghua Ling, Shenzhen (CN); Wenli Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 220 days.

(21) Appl. No.: 15/659,067

(22) Filed: Jul. 25, 2017

(65) Prior Publication Data

US 2018/0297078 A1    Oct. 18, 2018

(30) Foreign Application Priority Data

Apr. 14, 2017    (CN) .................... 2017 2 0396943 U

(51) Int. Cl.
| | |
|---|---|
| *B06B 1/04* | (2006.01) |
| *H02K 33/00* | (2006.01) |
| *H02K 33/02* | (2006.01) |
| *H02K 33/18* | (2006.01) |
| *H02K 33/16* | (2006.01) |

(52) U.S. Cl.
CPC .............. *B06B 1/045* (2013.01); *H02K 33/02* (2013.01); *H02K 33/16* (2013.01); *H02K 33/18* (2013.01)

(58) Field of Classification Search
CPC ........ H02K 33/16; H02K 33/02; H02K 33/18; B06B 1/045
USPC ......................................................... 310/25
See application file for complete search history.

(56) References Cited

U.S. PATENT DOCUMENTS

| | | | | |
|---|---|---|---|---|
| 8,253,282 B2 * | 8/2012 | Park | ...................... | H02K 33/16 310/25 |
| 8,258,657 B2 * | 9/2012 | Kim | ...................... | H02K 15/02 310/28 |
| 8,278,786 B2 * | 10/2012 | Woo | ...................... | H02K 33/16 310/15 |
| 8,410,642 B2 * | 4/2013 | Dong | ..................... | H02K 33/16 310/25 |
| 8,648,502 B2 * | 2/2014 | Park | ...................... | H02K 33/16 310/15 |
| 8,766,494 B2 * | 7/2014 | Park | ...................... | H02K 35/02 310/25 |
| 9,024,489 B2 * | 5/2015 | Akanuma | ............... | H02K 33/16 310/15 |

(Continued)

*Primary Examiner* — Alex W Mok
(74) *Attorney, Agent, or Firm* — Na Xu; IPro, PLLC

(57) ABSTRACT

The present disclosure relates to a vibration motor, comprising a housing, a vibrator, an elastic member, a first block and a second block; the elastic member comprises first elastic member and second elastic member facing toward each other and each comprises a first fixing portion, two extending portions and two second fixing portions, the first fixing portion is fixed on the first surface, the two extending portion extend from the first fixing portion along two opposite directions and surrounds the second surface, the two second fixing portions are fixed on the side wall away from the first fixing portion; the first block is on a side of the first fixing portion corresponding to the side wall, the second block is on the side wall, faces towards the first block and is spaced from the first block. The second block is adjacent to the second fixing portion and is between the two second fixing portions.

8 Claims, 2 Drawing Sheets

(56) References Cited

U.S. PATENT DOCUMENTS

| | | | | |
|---|---|---|---|---|
| 2009/0267423 A1* | 10/2009 | Kajiwara | ............... | H02K 33/02 |
| | | | | 310/36 |
| 2011/0127858 A1* | 6/2011 | Park | ........................ | B06B 1/045 |
| | | | | 310/25 |
| 2011/0156500 A1* | 6/2011 | Dong | ..................... | H02K 33/16 |
| | | | | 310/25 |
| 2011/0241451 A1* | 10/2011 | Park | ........................ | B06B 1/045 |
| | | | | 310/25 |
| 2012/0032535 A1* | 2/2012 | Park | ........................ | H02K 35/02 |
| | | | | 310/25 |
| 2012/0049660 A1* | 3/2012 | Park | ........................ | B06B 1/045 |
| | | | | 310/25 |
| 2012/0169148 A1* | 7/2012 | Kim | ........................ | H02K 33/16 |
| | | | | 310/25 |
| 2012/0187780 A1* | 7/2012 | Bang | ..................... | H02K 33/16 |
| | | | | 310/25 |
| 2013/0221767 A1* | 8/2013 | Akanuma | ............. | H02K 33/02 |
| | | | | 310/15 |
| 2013/0229070 A1* | 9/2013 | Akanuma | ............. | H02K 33/00 |
| | | | | 310/25 |
| 2016/0181900 A1* | 6/2016 | Xu | ........................ | H02K 33/16 |
| | | | | 310/12.27 |
| 2016/0181902 A1* | 6/2016 | Xu | ........................ | H02K 33/16 |
| | | | | 310/17 |

* cited by examiner

VIBRATION MOTOR

TECHNICAL FIELD

The present application relates to a vibration motor and, particularly, relates to a linear vibration motor which vibrates along a horizontal direction.

BACKGROUND

With the development of electronic techniques, portable consumable electronic products have become more and more popular, for example, cell phones, hand-held game players, navigation devices or hand-held multimedia entertainment equipment, etc. These electronic products generally adopt a linear vibration motor for systematic feedbacks, for example, incoming call prompt and message prompt of cell phones, navigation prompt, and vibrating feedback of game players, etc. Such a wild application requires the vibration motor to have excellent performance and longer service life.

The vibration motor generally includes a housing having accommodating space, a vibrator accommodated in the accommodating space, and an elastic member which is connected with the housing and the vibrator, and the elastic member supports the vibrator to move reciprocally to generate vibration in the housing. The elastic member in the prior art generally includes two springs. The two springs are arranged at two sides of the vibrator and around the vibrator, respectively. A middle position of the spring is welded to the vibrator, and two ends of the spring respectively extend to two opposite sides of the vibrator and are fixed with the housing. In order to avoid falling impact, a block is usually disposed at the middle welding position. However, when the vibration motor vibrates, the fixing portions of the two ends of the spring readily collide with the block. In view of this, a certain distance is usually set between each of the fixing portions of the two ends and the middle welding position, which causes that the arm of force of the spring is short and the elasticity property is reduced.

Thus, it is necessary to provide a new linear vibration motor to solve the above-mentioned problem.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present application is further illustrated as follows with reference to the accompanying drawings.

Figure 1:
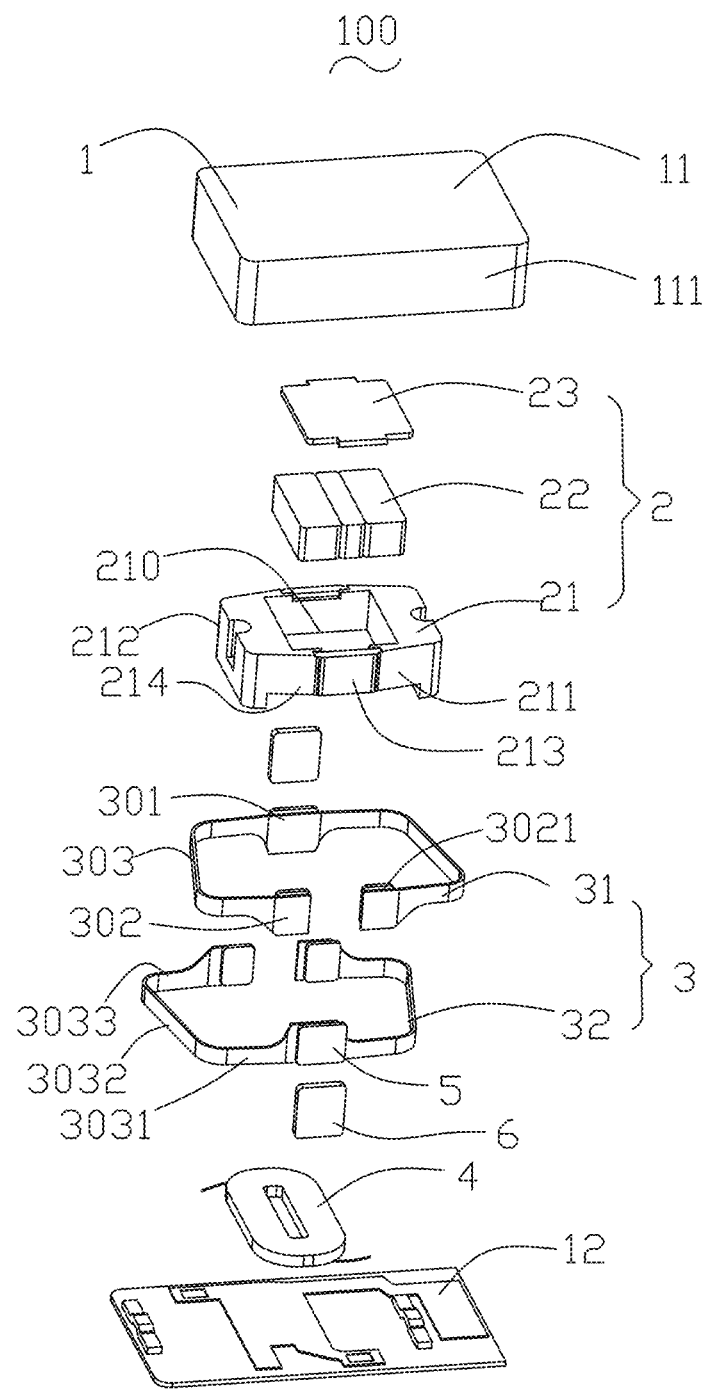
FIG. 1 is an exploded structural schematic diagram of a vibration motor according to an exemplary embodiment of the present application.

As shown in FIG. 1, the present application provides a vibration motor 100. The vibration motor includes a housing 1, a vibrator 2, an elastic member 3 and a driving unit 4. The vibrator 2 is accommodated in the housing 1, the elastic member 3 is configured to elastically support the vibrator 2, and the driving unit 4 is configured to drive the vibrator 2 to vibrate.

The housing 1 includes a cover 11 and a bottom plate 12. The cover 11 includes a side wall 111. The bottom plate 12 is covered by the cover 11 and is connected with the cover 11. The cover 11 and the bottom plate 12 define an accommodating space. The driving unit 4 is fixed on the bottom plate 12, and the elastic member 3 is fixed on the side wall 111 of the cover 11. In the present embodiment, the driving unit 4 is a coil.

The vibrator 2 includes a weight 21 and a magnet 22. The magnet 22 is disposed on the weight 21. Specifically, the weight 21 includes a through hole 210, the through hole 210 penetrates through the weight 21 along a direction perpendicular to a vibrating direction of the vibrator 2. The magnet 22 is located in the through hole 210. The magnet 22 faces toward the coil. When the coil is energized, the magnet 22 will drive the vibrator to vibrate along a direction parallel to the bottom plate 12 as a function of Lorentz force.

The magnet 22 may be a permanent magnet or a combination of a plurality of permanent magnets. In an exemplary embodiment, the magnet 22 includes three parallel permanent magnets, and all the three permanent magnets are located in the through hole 210. In alternative exemplary embodiments, it is also possible that, the weight may include a plurality of through holes, or merely one permanent magnet. Besides, the vibrator 2 further includes a magnetic conductor 23, the magnetic conductor 23 is attached on the weight 21 and the magnet 22, and the magnetic conductor 23 is configured to converge divergent magnetic induction lines and improve magnetization intensity.

The weight 21 includes a first surface 211 and a second surface 212. The first surface 211 and the second surface 212 face toward the side wall 111. Further, the first surface 211 is arranged along the vibrating direction of the vibration motor, and the second surface 212 is perpendicular to the vibrating direction of the vibration motor.

Figure 2:
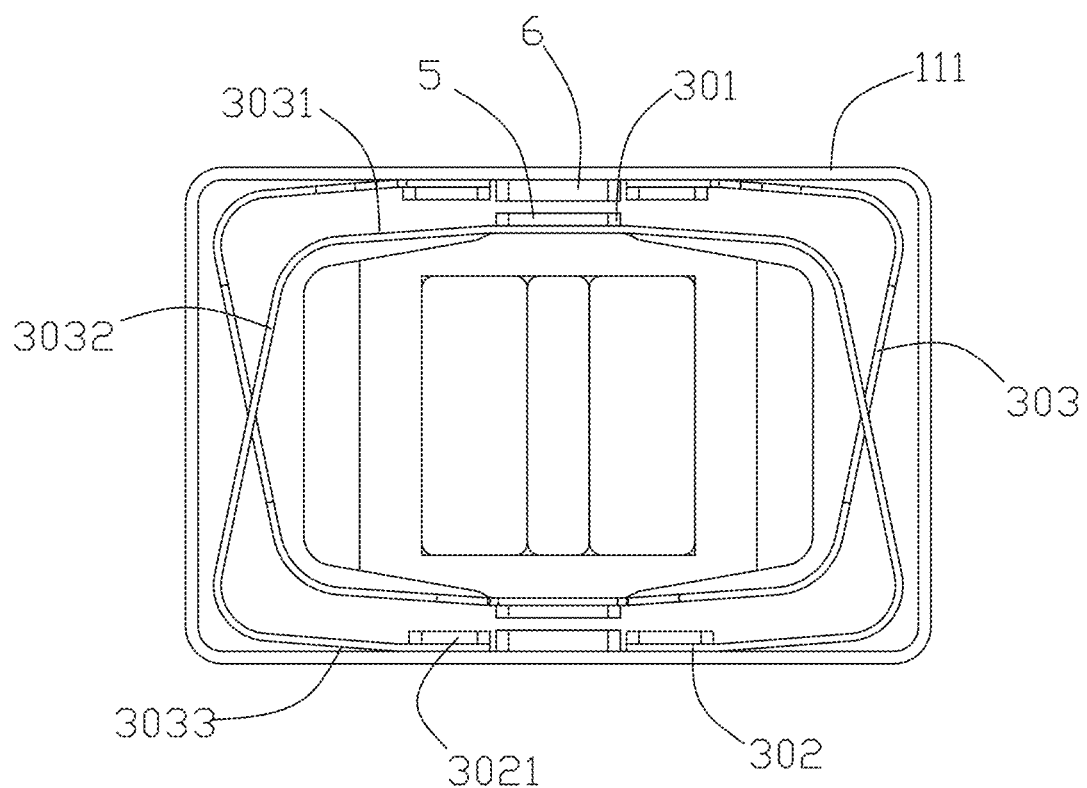
FIG. 2 is a structural schematic diagram of an assembling structure of a vibrator and a housing of a vibration motor according to an exemplary embodiment of the present application.

As shown in FIG. 2, the elastic member 3 includes a first elastic member 31 and a second elastic member 32. The first elastic member 31 and the second elastic member 32 face towards each other. The first elastic member 31 and the second elastic member 32 are identical in structure, and each includes a first fixing portion 301, a second fixing portion 302 and an extending portion 303. The first fixing portion 301 is fixed on the first surface 211 of the weight. The second fixing portion 302 is fixed on the side wall 111 far away from the first fixing portion 301. The extending portion 303 connects the first fixing portion 301 with the second fixing portion 302. Further, the extending portion 303 surrounds the second surface 212 and is spaced from the second surface 212.

The first fixing portions 301 of the first elastic member 31 and the second elastic member 32 are fixed on the two first surfaces 211 at two opposite sides of the vibrator 2, respectively. The extending portions 303 of the first elastic member 31 and the second elastic member 32 intersect with each other. The first elastic member 31 and the second elastic member 32 oppositely bend and extend toward each other.

The vibration motor 100 further includes a first block 5 and a second block 6. The first block 5 is disposed on the first fixing portion 301, the second block 6 is disposed on the side wall 111 and corresponds to the first block 5, and the first block 5 is spaced from the second block 6. Accordingly, if the vibration motor falls, the first block 5 will firstly contact with the second block 6, so as to guarantee that the reliability of the vibration motor will not be influenced by the impact of the vibrator. The second fixing portion 302 abuts against an edge of the second block 6. In the present embodiment, the second block 6 is clamped between two second fixing portions 302, so as to maximize the utilization of the space, increase the arm of force of the elastic member and improve the vibrating performance of the vibrator. Further, the second fixing portion 302 further includes a third buffer 3021, and the third buffer 3021 is configured to avoid collision between the elastic member and the vibrator or between the elastic members.

In an exemplary embodiment, the extending portion 303 includes two first extending portions 3031, two second extending portions 3032 and two third extending portions 3033. The two first extending portions 3031 extend from the first fixing portion 301, and the extending directions of the two first fixing portions 301 are opposite to each other. The two second extending portions 3032 bend and extend from the two first extending portions 3031, respectively. Moreover, each of the two second extending portions 3032 is spaced from the second surface 212. The two third extending portions 3033 bend and extend from the two second extending portions 3032 towards the side walls 111, respectively. In other alternative embodiments, the extending portion 303 may be structured in other forms, as long as the extending portion 303 can connect and support the elastic members.

Further, the weight 21 further includes a fixing stage 213 on the first surface 211. The fixing stage 213 protrudes towards the side wall 111 and matches the first fixing portion. The first fixing portion 301 is fixed on the fixing stage 213. Specifically, in the present embodiment, the first fixing portion 301 is fixed with the fixing stage 213 by welding. Similarly, the second fixing portion 302 is fixed with the side wall 111 of the housing by welding.

Additionally, the weight 21 defines two avoiding portions 214. The two avoiding portions 214 are located at two sides of the fixing stage 213, respectively. Moreover, the two avoiding portions 214 are recessed away from the side wall to give way to the first extending portion and the third extending portion. Thus, during vibrating, the collision between the elastic member 3 and the vibrator 2 can be avoided, so as to guarantee the reliability of the vibration motor.

During assembling of the vibrator, firstly the two first fixing portions 301 of the elastic member 3 are welded to two fixing stages 213 of the weight 21, respectively; and then each second fixing portion 302 is welded to a corresponding side wall 111. Thus, the defect of the prior art that the welding of the elastic member should be performed through a mounted spring after the elastic member is mounted can be avoided, so as to facilitate the operation, fasten the fixing and improve the vibrating performance of the vibration motor.

The second block can improve the reliability of the vibration motor and avoid the influence on the performance of the vibration motor due to falling off; the second fixing portion abuts against the edge of the second block; the extending portion can be extended and, specifically, the length of the third extending portion is increased, so as to extend the arm of force of the elastic member and improve the vibrating performance.

Advantages of the vibration motor of the present application include that the arm of force of the elastic member is extended and the vibrating performance is improved.

Though the exemplary embodiments of the present application are shown and described above, it should be understood that, the above are merely exemplary and are not intended to limit the present application, and the person skilled in the art can make variations, amendments, replacements and modifications to the above embodiments within the protection scope of the present application.

What is claimed is:

1. A vibration motor, comprising:
   a housing comprising a side wall;
   a vibrator accommodated in the housing, the vibrator comprising two first surface and two second surfaces, the two first surfaces facing the side wall along a vibrating direction of the vibrator, and the two second surfaces connecting the two first surfaces;
   a driving unit accommodated in the housing;
   an elastic member accommodated in the housing to elastically support the vibrator, the elastic member comprising a first elastic member and a second elastic member facing toward the first elastic member, each of the first elastic member and the second elastic member comprising a first fixing portion, an extending portion and two second fixing portions;
   a first block; and
   a second block;
   wherein the first fixing portion is fixed on the first surface, the extending portion extends from the first fixing portion along two opposite directions facing away from one another and surrounds the two second surfaces, the two second fixing portions are connected with the extending portion and are fixed on the side wall away from the first fixing portion; the first fixing portion of the first elastic member and the first fixing portion of the second elastic member are fixed on the two first surfaces at two opposite sides of the vibrator facing away from one another, respectively;
   wherein the first block is on a side of the first fixing portion corresponding to the side wall, the second block is on the side wall, faces towards the first block and is spaced from the first block, the second block is adjacent to the second fixing portions and is between the two second fixing portions.

2. The vibration motor as described in claim 1, wherein the extending portion comprises two first extending portions, two second extending portions and two third extending portions; the two first extending portions extend from the first fixing portion along two opposite extending directions facing away from one another; the two second extending portions bend and extend from the two first extending portions and are spaced from the second surface, respectively; the two third extending portions bend and extend from the two second extending portions towards the side wall, respectively; and the two third extending portions are connected with the two second fixing portions, respectively.

3. The vibration motor as described in claim 2, wherein the vibrator comprises a weight and a magnet, the weight defines a through hole, the magnet is disposed in the through hole, the driving unit comprises a coil facing toward the magnet, and the two first surfaces and the two second surfaces are on the weight.

4. The vibration motor as described in claim 3, wherein the weight comprises a fixing stage on each of the two first surfaces, and the fixing stage matches the first fixing portion.

5. The vibration motor as described in claim 4, wherein the weight further defines two avoiding portion at two sides of the fixing stage, and the two avoiding portions are recessed towards a direction away from the side wall, and the two avoiding portions are configured to give way to the first extending portion and the third extending portion.

6. The vibration motor as described in claim 4, wherein the first fixing portion is fixed with the fixing stage by welding.

7. The vibration motor as described in claim 6, wherein the second fixing portion is fixed with the side wall by welding.

8. The vibration motor as described in claim 3, further comprising a third block at a side of the second fixing portion opposite to the vibrator.

\* \* \* \* \*